(12) United States Patent
Kanamaru

(10) Patent No.: US 12,442,737 B2
(45) Date of Patent: Oct. 14, 2025

(54) STRESS MEASURING METHOD, STRESS MEASURING APPARATUS, AND COMPUTER READABLE NON-TRANSITORY STORAGE MEDIUM

(71) Applicant: SHIMADZU CORPORATION, Kyoto (JP)

(72) Inventor: Kuniaki Kanamaru, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 459 days.

(21) Appl. No.: 18/074,515

(22) Filed: Dec. 5, 2022

(65) Prior Publication Data

US 2023/0175936 A1 Jun. 8, 2023

(30) Foreign Application Priority Data

Dec. 6, 2021 (JP) ................................. 2021-197632

(51) Int. Cl.
*G01N 3/06* (2006.01)
*G06F 17/11* (2006.01)

(52) U.S. Cl.
CPC ............. *G01N 3/068* (2013.01); *G06F 17/11* (2013.01)

(58) Field of Classification Search
CPC .......... G01N 3/068; G01N 2203/0212; G01N 2203/0647; G01N 3/08; G06F 17/11;
(Continued)

(56) References Cited

U.S. PATENT DOCUMENTS

2001/0008445 A1* 7/2001 Ifju ........................... G01L 1/24
356/32
2009/0050847 A1* 2/2009 Xu ............................ F21K 2/04
252/301.4 R
(Continued)

FOREIGN PATENT DOCUMENTS

CN 108593429 9/2018
CN 108680288 10/2018
(Continued)

OTHER PUBLICATIONS

Xu Chao-Nan et al., "Mechanoluminescence and Novel Structural Health Diagnosis," NTS (2012), Aug. 2012, pp. 92-103, with Enlgish translation thereof.
(Continued)

*Primary Examiner* — Alexander Satanovsky
(74) *Attorney, Agent, or Firm* — JCIPRNET

(57) ABSTRACT

Creating a calibration curve representing a relationship between a luminescence intensity of stress luminescence and a stress includes: forming a second stress luminescent film on a surface of a test piece; applying external force to the test piece; detecting external force to be applied to the test piece; photographing the test piece under application of external force; creating a luminescence intensity-stress curve plotting a relationship between a luminescence intensity of stress luminescence and a stress, on the basis of a photographed luminescence image of the second stress luminescent film and a detection value of the external force; and creating a regression equation consisting of a fourth or higher degree polynomial representing a regression relationship of the stress with respect to the luminescence intensity by polynomial regression analysis of the luminescence intensity-stress curve.

10 Claims, 10 Drawing Sheets

(58) Field of Classification Search
CPC . G06F 17/18; G01L 1/24; G01L 25/00; G01L 1/241
See application file for complete search history.

(56) References Cited

U.S. PATENT DOCUMENTS

| | | | |
|---|---|---|---|
| 2019/0302070 A1* | 10/2019 | Ito | G01N 30/8631 |
| 2021/0333181 A1 | 10/2021 | Zhang et al. | |
| 2021/0356400 A1 | 11/2021 | Yokoi et al. | |
| 2023/0028057 A1* | 1/2023 | Okoli | C09K 11/574 |

FOREIGN PATENT DOCUMENTS

| | | | | |
|---|---|---|---|---|
| CN | 113670707 | | 11/2021 | |
| EP | 1121567 | * | 9/2004 | G01B 11/16 |
| JP | 2015075477 | | 4/2015 | |
| JP | 2020016624 | | 1/2020 | |

OTHER PUBLICATIONS

"Office Action of China Counterpart Application", issued on Jun. 19, 2025, with English translation thereof, p. 1-p. 23.

* cited by examiner

STRESS MEASURING METHOD, STRESS MEASURING APPARATUS, AND COMPUTER READABLE NON-TRANSITORY STORAGE MEDIUM

CROSS-REFERENCE TO RELATED APPLICATION

This application claims the priority benefit of Japanese application serial no. 2021-197632, filed on Dec. 6, 2021. The entirety of the above-mentioned patent application is hereby incorporated by reference herein and made a part of this specification.

BACKGROUND

Technical Field

The present disclosure relates to a stress measuring method, a stress measuring apparatus, and a computer readable non-transitory storage medium.

Description of Related Art

There has been known a technique of analyzing a strain of a measurement target to which a stress luminescent member is applied or adhered by measuring a strain of the stress luminescent member on the basis of luminescence of the stress luminescent member (see, for example, Japanese Patent Laying-Open No. 2015-75477).

The stress luminescent member is a member that releases energy and emits light when the energy state is enhanced, and emits light depending on a stress generated inside when a mechanical force is applied from outside. Since there is a correlation between a luminescence intensity (luminance) and a strain amount of the stress luminescent member, the stress luminescent member is photographed by a photographing device, and the strain of the stress luminescent member can be measured from the luminance of the stress luminescent member.

SUMMARY

However, the luminescence intensity of the stress luminescent member, and the stress generated in the stress luminescent member do not have a perfect proportional relationship. Therefore, a deviation between the stress measured on the basis of the luminescence intensity, and the stress actually generated can increase depending on the magnitude of the stress. This leads to the fear that distribution of stress generated on the surface of the measurement target cannot be accurately determined.

The present disclosure was devised to solve such a problem, and it is an object of the present disclosure to provide a stress measuring method, a stress measuring apparatus and a computer readable non-transitory storage medium capable of accurately measuring a stress generated in a measurement target on the basis of a luminescence intensity of a stress luminescent film formed on a surface of the measurement target.

A stress measuring method according to the first aspect of the present disclosure is a stress measuring method that measures a stress generated in a sample when external force is applied to the sample. The stress measuring method includes: creating a calibration curve representing a relationship between a luminescence intensity of stress luminescence and a stress; forming a first stress luminescent film on a sample; applying external force to the sample; and measuring a stress generated in the sample on the basis of a luminescence intensity of the first stress luminescent film under application of the external force to the sample, using the calibration curve. The creating the calibration curve includes forming a second stress luminescent film having the same configuration as the first stress luminescent film on a surface of a test piece, applying external force to the test piece, detecting the external force to be applied to the test piece, photographing the test piece under application of the external force, creating a luminescence intensity-stress curve plotting a relationship between a luminescence intensity of stress luminescence and a stress, on the basis of a photographed luminescent image of the second stress luminescent film and a detection value of the external force obtained by the detecting the external force, creating a regression equation consisting of a fourth or higher degree polynomial representing a regression relationship of the stress with respect to the luminescence intensity by polynomial regression analysis of the luminescence intensity-stress curve, and storing the regression equation as the calibration curve.

A computer readable non-transitory storage medium according to the second aspect of the present disclosure stores a stress measuring program to be executed by a computer. The stress measuring program is a stress measuring program that measures a stress generated in a sample when external force is applied to the sample. On a surface of the sample, a first stress luminescent film is formed. The stress measuring program causes a computer to execute creating a calibration curve representing a relationship between a luminescence intensity of stress luminescence and a stress. The creating the calibration curve includes applying external force to a test piece having a surface formed with a second stress luminescent film having the same configuration as the first stress luminescent film, applying external force to the test piece, detecting the external force to be applied to the test piece, photographing the test piece under application of the external force, creating a luminescence intensity-stress curve plotting a relationship between a luminescence intensity of stress luminescence and a stress, on the basis of a photographed luminescent image of the second stress luminescent film and a detection value of the external force obtained by the detecting the external force, creating a regression equation consisting of a fourth or higher degree polynomial representing a regression relationship of the stress with respect to the luminescence intensity by polynomial regression analysis of the luminescence intensity-stress curve, and storing the regression equation as the calibration curve.

A stress measuring apparatus according to the third aspect of the present disclosure measures a stress generated in a sample when external force is applied to the sample. On a surface of the sample, a first stress luminescent film is formed. The stress measuring apparatus includes: a tester that applies external force to a sample; a light source that irradiates a stress luminescent film with excitation light; a photographing device that photographs a sample under application of external force; a storage device that stores a calibration curve representing a relationship between a luminescence intensity of stress luminescence and a stress; and a control device that measures a stress generated in the sample on the basis of a luminescence intensity of the first stress luminescent film photographed by the photographing device using the calibration curve. The tester applies external force to a test piece having a surface formed with a second stress luminescent film having the same configuration as the first stress luminescent film, and detects the external force to be applied to the test piece. The photographing device photographs the test piece under application of the external force. The control device creates a luminescence intensity-stress curve plotting a relationship between a luminescence intensity of stress luminescence and a stress on the basis of a luminescent image of the second stress luminescent film photographed by the photographing device, and a detection value of the external force. The control device creates a regression equation consisting of a fourth or higher degree polynomial representing a regression relationship of the stress with respect to the luminescence intensity by polynomial regression analysis of the luminescence intensity-stress curve. The control device stores the regression equation as the calibration curve in the storage device.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
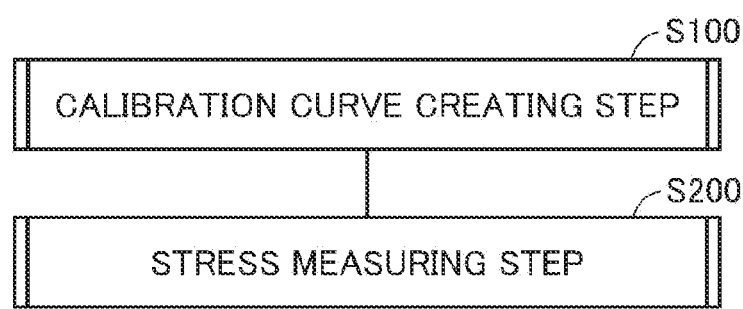
FIG. 1 is a flowchart regarding a stress measuring method according to an embodiment.

Hereinafter, embodiments of the present disclosure will be specifically described by referring to the drawings. In the drawings, the same or the corresponding part is denoted by the same reference number, and the description thereof is not repeated.

FIG. 1 is a flowchart regarding a stress measuring method according to an embodiment. The stress measuring method according to the embodiment shown in FIG. 1 mainly has a calibration curve creating step (S100), and a stress measuring step (S200). In the calibration curve creating step (S100), a calibration curve representing a relationship between a luminescence intensity of a luminescent material and a stress is created. In the stress measuring step (S200), a stress generated in the sample is measured on the basis of a luminescence intensity of the stress luminescent member using the created calibration curve. Further, on the basis of the measured stress, distribution of stress on the sample surface is measured.

[Calibration Curve Creating Step]

Figure 2:
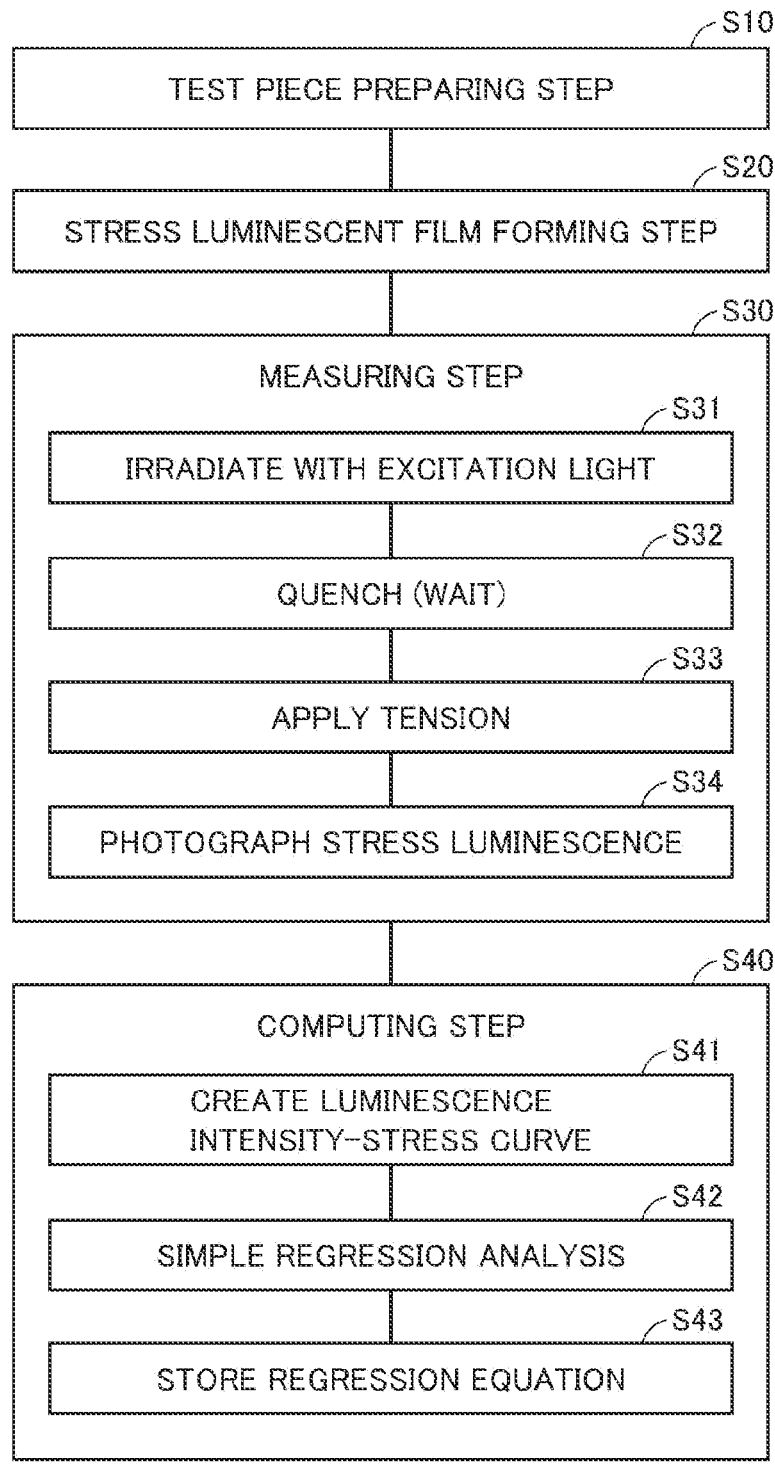
FIG. 2 is a flowchart for illustrating a calibration curve creating step.

First, referring to FIG. 2, the calibration curve creating step (S100 in FIG. 1) is described.

FIG. 2 is a flowchart for illustrating the calibration curve creating step (S100 in FIG. 1). As shown in FIG. 2, the calibration curve creating step (S100) has a test piece preparing step (S10), a stress luminescent film forming step (S20), a measuring step (S30), and a computing step (S40).

Figure 3:
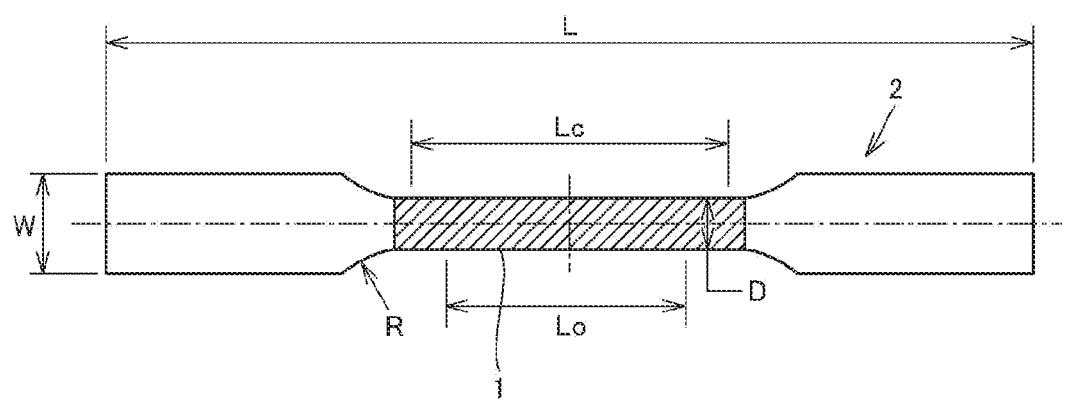
FIG. 3 is a view schematically showing a test piece.

First, the test piece preparing step (S10) is performed. FIG. 3 is a view schematically showing a test piece. Referring to FIG. 3, a test piece 2 is formed of a metallic material. As test piece 2, those defined in the Japanese Industrial Standards (JIS) Z-2201 "Test pieces for tensile test for metallic materials" can be used. In the present embodiment, a tensile test for metallic materials is performed as a strength test for metallic materials. In the tensile test, by applying a strain to test piece 2 until it ruptures by the tension, mechanical properties of the metallic material are measured.

The metallic material forming test piece 2 is, for example, aluminum, and is A1050 (pure aluminum with purity of greater than or equal to 99.50%). In the example of FIG. 3, test piece 2 is a plate-like test piece conforming to JIS13B, having an entire length L=220 mm, a gauge length Lo=50 mm, a length of parallel portion Lc=75 mm, a width W=25 mm, a width of parallel portion D=12.5±0.04 mm, a radius of shoulder portion R=25 mm, and a plate thickness t=1 mm.

Next, the stress luminescent film forming step (S20) is performed. In this step (S20), a stress luminescent film 1 is formed in a predetermined region of the surface of test piece 2. As shown in FIG. 3, stress luminescent film 1 is arranged in a predetermined region of the surface of test piece 2. The predetermined region is located to cover a parallel portion of test piece 2, and has a rectangular shape of 80 mm wide and 12.5 mm long. The film thickness of stress luminescent film 1 is approximately 4 μm (4±0.5 μm). In the present description, the film thickness of the stress luminescent film refers to the height of the stress luminescent film in the direction perpendicular to the surface of the test piece.

Stress luminescent film 1 is obtained by molding a stress luminescent material alone, or by molding a stress luminescent material after combined with other material (such as resin). The stress luminescent material refers to a material that emits light by mechanical stimulation of force (tensile, compression, displacement, friction, impact, and so on) exerted from outside.

The stress luminescent material is a material in which an element that is to be the luminescence center is solid-solved in the backbone of inorganic crystals (base), and is represented by strontium aluminate doped with europium. Other examples include zinc sulfide, barium/calcium titanate, calcium/yttrium aluminate doped with transition metal or rare earth, and so on. Those known in the art may be used as the stress luminescent material.

Examples of the method for forming stress luminescent film 1 on the surface of test piece 2 include a method of pasting a stress luminescent sheet in which the stress luminescent material is mixed to test piece 2 with an adhesive, and a method of applying a paint containing the stress luminescent material (stress luminescent paint) to test piece 2.

In stress luminescent film 1, luminescence intensity is in proportion to strain energy. Also, since stress luminescent film 1 strongly adheres to the surface of test piece 2, stress luminescent film 1 and test piece 2 equally deform. Therefore, distribution of stress generated on the surface of test piece 2 by deformation can be imaged (visualized) by luminescence of stress luminescent film 1.

Next, the measuring step (S30) is performed. In this step (S30), a stress generated in test piece 2 is measured by utilizing the luminescent phenomenon of stress luminescent film 1 under application of external force to test piece 2. Luminescence of stress luminescent film 1 can be measured by using a stress measuring apparatus 100 shown in FIG. 3. In the example of FIG. 2, stress measuring apparatus 100 is configured to measure stress luminescence when a tension is applied to test piece 2.

Figure 4:
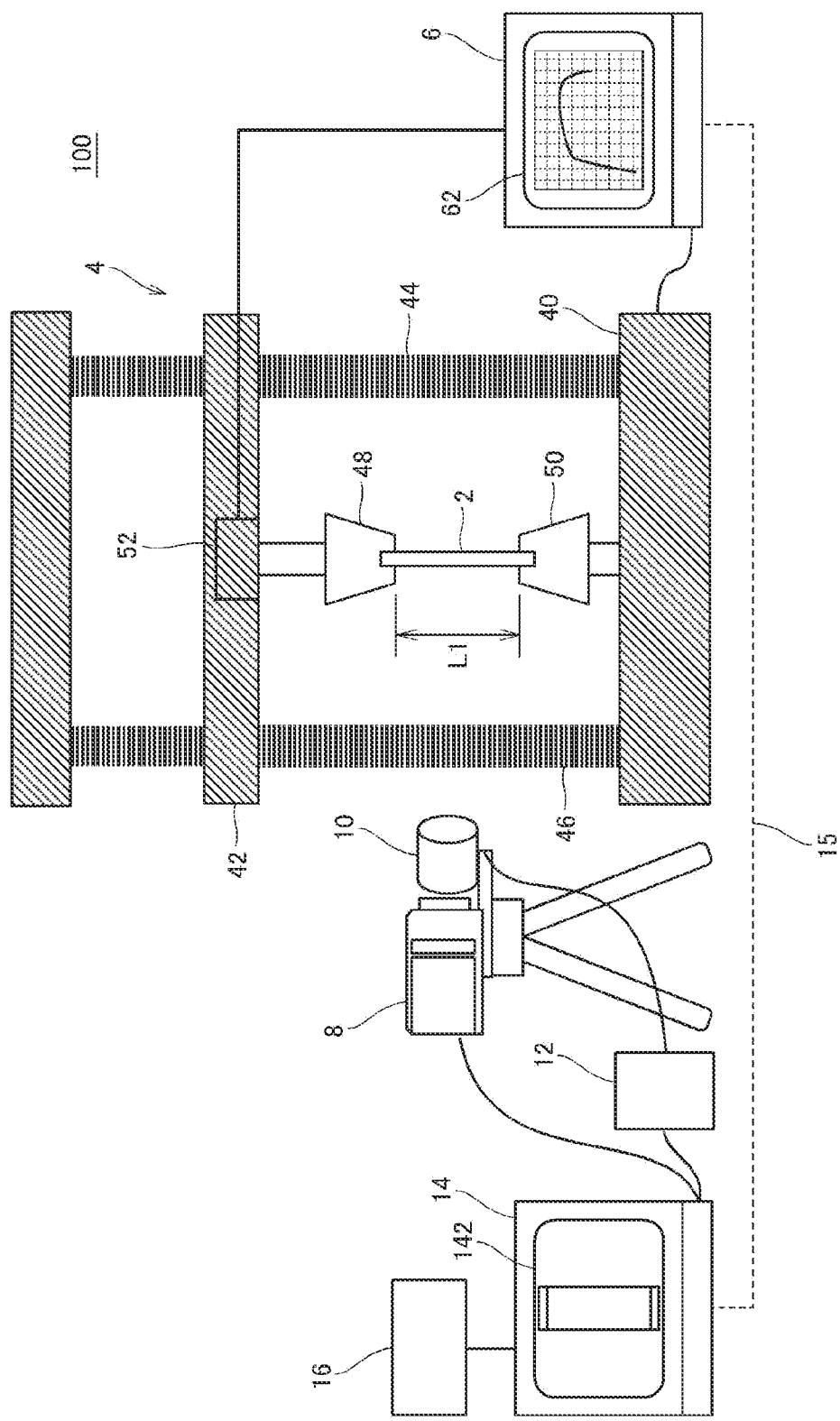
FIG. 4 is a block diagram showing a configuration example of a stress measuring apparatus to be used in a measuring step.

FIG. 4 is a block diagram showing a configuration example of stress measuring apparatus 100 to be used in the measuring step (S30). Referring to FIG. 4, stress measuring apparatus 100 includes a tensile tester 4, a control device 6, a photographing device 8, a light source 10, a drive device 12, a control device 14, and a storage device 16. In stress measuring apparatus 100, at least tensile tester 4, photographing device 8, and light source 10 are installed in a dark room.

Tensile tester 4 is a device that applies a tension to test piece 2, and measures mechanical properties such as tensile strength, yield point, elongation, contraction of area and the like of test piece 2. In the example of FIG. 4, as tensile tester 4, Precision Universal Tester (product name: Autograph AG-X plus, available from Shimadzu Corporation) is used. Tensile tester 4 corresponds to one example of "tester".

Tensile tester 4 has a table 40, a crosshead 42, a pair of threaded rods 44, 46, an upper gripper 48, a lower gripper 50, and a load cell 52. Pair of threaded rods 44, 46 rotatably stand on table 40 in vertically oriented positions. Pair of threaded rods 44, 46 are configured by a ball screw.

Crosshead 42 is connected to each of threaded rods 44, 46 via a nut (not shown). Crosshead 42 is configured in a movable manner in the vertical direction along pair of threaded rods 44, 46. In table 40, a load mechanism (not shown) for elevating and lowering crosshead 42 is mounted.

Upper gripper 48 is connected to crosshead 42, and grips an upper end part of test piece 2. Lower gripper 50 is connected to table 40, and grips a lower end part of test piece 2. An interval L1 between upper gripper 48 and lower gripper 50 is equal to 120 mm. In a tensile test, tensile tester 4 applies a tension to test piece 2 by elevating crosshead 42 according to the control of the control device 14 while gripping both end parts of test piece 2 with upper gripper 48 and lower gripper 50.

Load cell 52 is a sensor for detecting a test force which is a tension applied to test piece 2. Load cell 52 outputs a signal indicating the detected test force to control device 14.

Control device 6 is connected with tensile tester 4 to communicate with each other, and controls a tensile operation by tensile tester 4. Control device 6 receives user operations such as setting operations of various parameters including test conditions of the tensile test, and execution instructing operations, and controls the load mechanism according to the received user operations. Control device 6 further receives from tensile tester 4 various signals including an output signal of load cell 52 and a signal indicating an amount of displacement of crosshead 42, and analyzes data such as a detection value of the test force.

Control device 6 has a processor such as CPU (Central Processing Unit), memory such as ROM (Read Only Memory) and RAM (Random Access Memory), an interface circuit for connecting peripherals, and a display 62. By execution of a tensile test program stored in the memory by the processor, various functions as described above are realized.

Display 62 displays various sorts of information on the basis of signals inputted to control device 6. For example, display 62 displays a test force detected by load cell 52 during execution of the tensile test. Also, the display 62 displays an amount of displacement indicating displacement (stroke) of crosshead 42.

Light source 10 is disposed to face with test piece 2, and is configured to irradiate stress luminescent film 1 on test piece 2 with excitation light. Light source 10 is, for example, a blue LED (Light Emitting Diode). Receiving the excitation light emitted from light source 10, stress luminescent film 1 transits to a luminescent state. The number of light source 10 is not limited. For example, a plurality of light sources 10 may be disposed to emit excitation light toward test piece 2 from a plurality of directions.

Drive device 12 supplies electric power for driving light source 10, and controls ON/OFF of light source 10. Drive device 12 is capable of controlling light quantity of the excitation light emitted from light source 10, irradiation time with the excitation light, and so on.

Photographing device 8 is disposed to include at least a predetermined region of test piece 2 in a photographing field. Photographing device 8 includes an optical system such as a lens, and an image pickup device. The image pickup device is realized, for example, by a CCD (Charge Coupled Device) sensor, a CMOS (Complementary Metal Oxide Semiconductor) sensor or the like. The image pickup device generates a photographic image by converting light incident from test piece 2 via the optical system into an electric signal. Photographing device 8 is an industrial camera (machine vision camera). In the example of FIG. 4, photographing device 8 is installed at a position about 30 cm distanced from test piece 2.

Control device 14 controls a photographing operation by photographing device 8, and driving of light source 10 by drive device 12. Control device 14 is connected to control device 6 of tensile tester 4 by a communication line 15. Control device 14 is capable of integrally controlling tensile tester 4, photographing device 8 and light source 10 by exchanging data with control device 6 via communication line 15. Communication between control device 14 and control device 6 may be realized by wireless communication.

While control device 14 of light source 10 and photographing device 8, and control device 6 of tensile tester 4 are provided as separate units in the present embodiment, control device 14 and control device 6 may be an integrated unit.

A display 142 displays various sorts of information on the basis of signals inputted to control device 14. For example, display 142 is capable of displaying data inputted from control device 6 via communication line 15 (test force detected by load cell 52, and an amount of displacement indicating displacement (stroke) of crosshead 42, and so on).

Also, display 142 is capable of displaying an image of stress luminescent film 1 (luminescent image) photographed by photographing device 8. Specifically, display 142 is capable of displaying a luminescent image photographed by photographing device 8 in real time.

Figure 5:
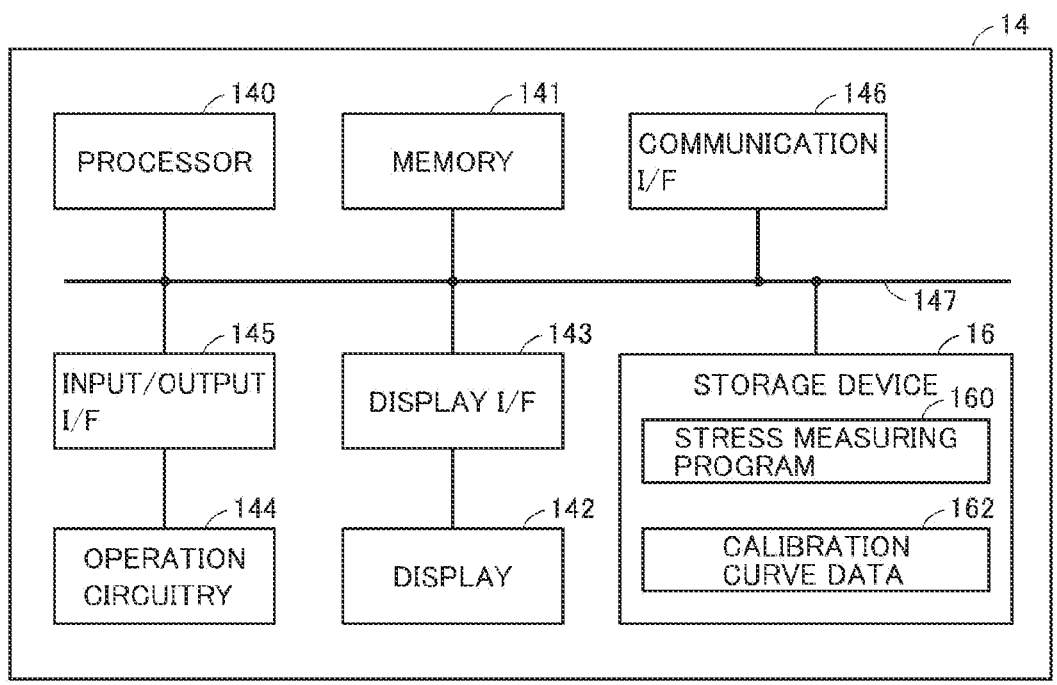
FIG. 5 is a schematic diagram showing one example of a hardware configuration of a control device.

FIG. 5 is a schematic diagram showing one example of a hardware configuration of control device 14. Referring to FIG. 5, control device 14 has a processor 140 such as CPU, memory 141 such as ROM and RAM, a communication I/F (interface) 146, an input/output I/F 145, a display I/F 143, and nonvolatile storage device 16. These components are mutually connected in a communicable manner via an internal bus 147.

Processor 140 expands a stress measuring program 160 stored in storage device 16, in memory 141 and executes the program, and thus various functions as described above are realized. Storage device 16 stores data to be exchanged with control device 6 (data such as a detection value of test force), and image data photographed by photographing device 8, in addition to stress measuring program 160. Storage device 16 further stores calibration curve data 162 created in the calibration curve creating step (S200).

Communication I/F 146 exchanges data with other devices. The other devices include control device 6 and external devices (not shown). Communication I/F 146 may be configured to be capable of downloading various kinds of data such as stress measuring program 160 and calibration curve data 162 from the external devices.

Input/output I/F 145 is connected to operation circuitry 144, and captures a signal indicating a user operation from operation circuitry 144. Operation circuitry 144 is typically embodied by a keyboard, a mouse, a touch panel, a touch pad and the like, and receives a user operation. Operation circuitry 144 may be configured integrally with control device 14, or may be configured separately from control device 14.

Display I/F 143 is connected to display 142, and outputs an image signal for displaying an image to display 142 according to a command from processor 140 or the like. Display 142 is configured by a LCD (Liquid Crystal Display) or an organic EL (Electro Luminescence) display or the like, and displays various sorts of information to a user.

While a configuration example in which necessary functions are provided by execution of programs by processor 140 is indicated in FIG. 5, part or all of these functions to be provided may be implemented by using a special hardware circuit (for example, ASIC (Application Specific Integrated Circuit) or FPGA (Field-Programmable Gate Array) or the like).

Next, the measuring step (S30) using stress measuring apparatus 100 shown in FIG. 3 is described.

Returning to FIG. 2, the measuring step (S30) has an excitation light irradiating step (S31), a quenching step (S32), a tension applying step (S33), and a stress luminescence photographing step (S34).

In the excitation light irradiating step (S31), the surface of test piece 2 is irradiated with excitation light from light source 10. By irradiating stress luminescent film 1 disposed in a predetermined region of test piece 2 with excitation light, stress luminescent film 1 is brought into an excited state.

The quenching step (S32) stops light source 10, and waits until the luminescence intensity of stress luminescent film 1 after excitation becomes stable. In the present embodiment, the irradiation time (exciting time) of light source 10 was 1 minute, and the waiting time (quenching time) after irradiation was 2 minutes.

Next, the tension applying step (S33) is performed. In the step (S33), a tension is applied to test piece 2 by driving tensile tester 4. The conditions of the tensile test included a tensile speed of 10 mm/min and a maximum load of 1500 N.

Figure 6:
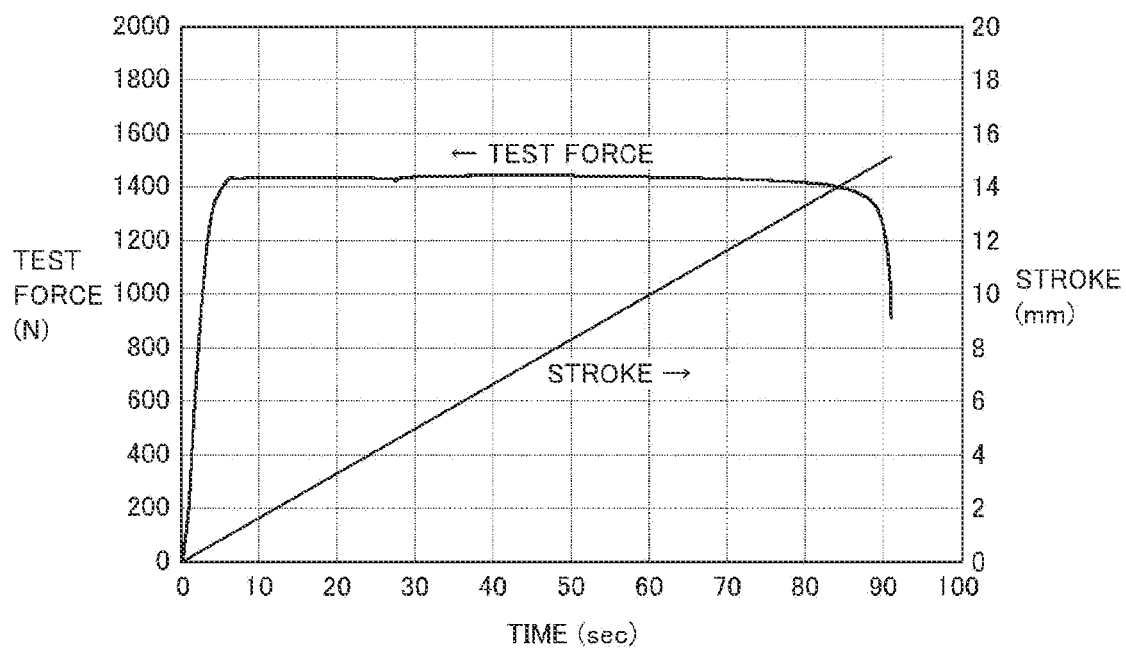
FIG. 6 is a chart showing the transition with time of a test force applied to the test piece.

FIG. 6 is a chart showing the transition with time of the test force applied to test piece 2. FIG. 6 shows transitions with time of the test force (corresponding to a tension) and the stroke (corresponding to an amount of displacement of crosshead 42). The test force is a detection value of load cell 52.

As shown in FIG. 6, as the application of a test force is started at time 0 (second), the stroke monotonously increases according to a preset tensile speed of 10 mm/min.

The test force linearly increases directly after starting of the test. This region corresponds to an elastic deformation region in which test piece 2 deforms linearly and elastically.

The increase in test force stops after 4 to 6 (seconds) from the start of the test, and thereafter, the test force is kept almost constant. This region corresponds to a plastic deformation region of test piece 2. In the example of FIG. 6, in the plastic deformation region, the test force keeps the value that is smaller than the maximum load of 1500 N for the increase in stroke. Then, after about 80 (seconds) from the start of the test, test piece 2 ruptures.

In the stress luminescence photographing step (S34), a predetermined region of test piece 2 is photographed by photographing device 8. That is, luminescence of stress luminescent film 1 is photographed by photographing device 8. In the present embodiment, as photographing device 8, for example, an industrial camera (product name: VCXU-15M, available from Baumer) is used, and stress luminescent film 1 was photographed while the frame rate was set at 1 fps.

Next, the computing step (S40) is performed. In this step (S40), a calibration curve is created by using a luminescent image photographed by photographing device 8 in the measuring step (S30). The calibration curve represents a relationship between a luminescence intensity of stress luminescent film 1 and a stress as described above.

In the present embodiment, regression analysis is used for creation of a calibration curve. Regression analysis is a technique of explaining and predicting a variable to be analyzed (response variable) by other one or more variables (explanatory variable). In this regression analysis, an equation representing a theoretical value of the response variable is called a regression equation.

Among regression analyses, a regression analysis in which one response variable is predicted by one explanatory variable is called a simple regression analysis. In the present embodiment, a simple regression analysis in which a stress generated in stress luminescent film 1 is a response variable, and a luminescence intensity of stress luminescence is an explanatory variable is performed. In the simple regression analysis, a regression equation representing a theoretical value of stress is acquired as the calibration curve.

Specifically, the computing step (S40) has a step of creating a luminescence intensity-stress curve (S41), a step of performing a simple regression analysis (S42), and a step of storing a regression equation in the simple regression analysis (S43).

First, the step of creating a luminescence intensity-stress curve (S41) is performed. In this step (S41), a luminescence intensity-stress curve plotting a relationship between a luminescence intensity of stress luminescent film 1 and a stress is created using an image of stress luminescent film 1 (luminescent image) obtained in the measuring step (S30) and a detection value of test force by load cell 52.

Specifically, image data (video data) photographed by photographing device 8 is cut out in frame. Image data corresponding to an elastic deformation region of test piece 2 is used. A luminescence intensity in a preset region of interest (ROI: Region Of Interest) of the luminescent image is calculated for each frame. Luminescence intensity in ROI can be calculated by statistically processing luminescence intensity in ROI. In the present embodiment, an average luminescence intensity in ROI is calculated.

Next, a stress generated in stress luminescent film 1 is calculated for each frame. The stress generated in stress luminescent film 1 is equivalent to the stress generated in test piece 2 by application of the test force. The stress generated in test piece 2 can be determined by dividing a detection value of test force (tension) by load cell 52 by a cross-sectional area of test piece 2. The cross-sectional area of test piece 2 is a cross-sectional area in the direction perpendicular to the direction in which the test force is applied.

Figure 7:
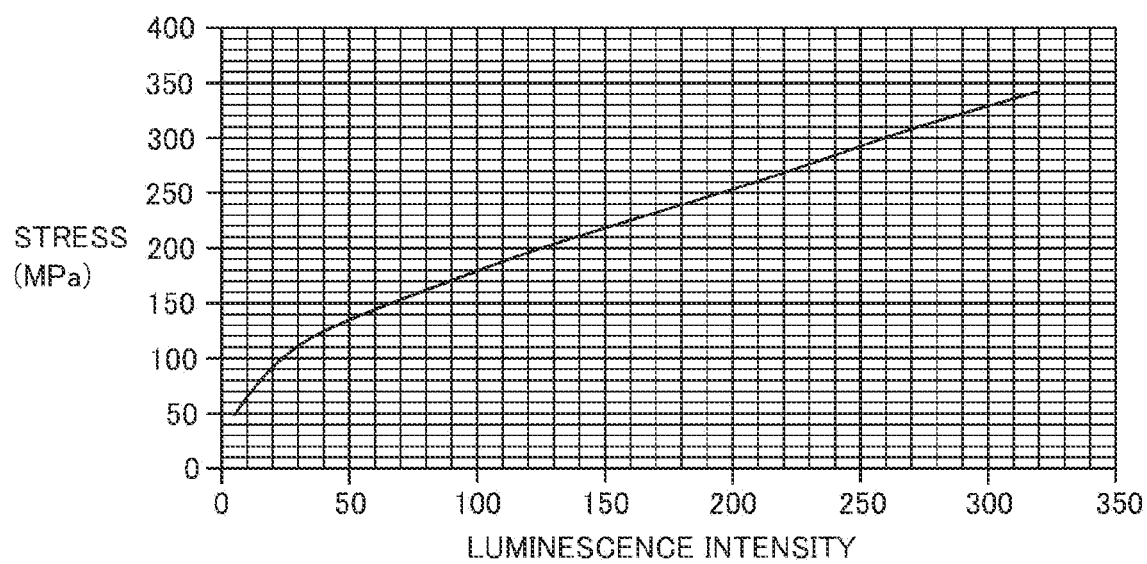
FIG. 7 shows one example of a luminescence intensity-stress curve created by the step (S41).

Once the luminescence intensity and the stress in ROI for each frame is determined, a stress with respect to a luminescence intensity of each frame is plotted on a two-dimensional coordinates consisting of a horizontal axis (x-axis) of luminescence intensity and a vertical axis (y-axis) of stress to create a luminescence intensity-stress curve. FIG. 7 shows one example of a luminescence intensity-stress curve created by the step (S41). As shown in FIG. 7, the relationship of stress corresponding to luminescence intensity is not perfectly linear. Basically the stress has linearity with respect to the luminescence intensity, however, in the region where the luminescence intensity is small, the stress does not have linearity with respect to the luminescence intensity.

In the step of performing a simple regression analysis (S42), a simple regression analysis is conducted for the luminescence intensity-stress curve to determine a regression equation. In the regression equation, when there are two variables x, y, the regression relationship of the variable y to the variable x can be represented by y=f(x). The variable x is called an independent variable, and the variable y is called a dependent variable. While various forms are assumable for the function f(x) in the regression equation, the most often used is a linear equation (linear expression). That is, y=a+bx (a, b are constants). This is called linear regression.

However, since the luminescence intensity-stress curve is not perfect linear as shown in FIG. 7, there is a fear that an error (prediction error) can arise between the stress predicted from the luminescence intensity and the actual stress according to the linear regression. Accordingly, in the present embodiment, by employing polynomial regression in which the dependent variable y is represented by an n-degree polynomial of the independent variable x, the prediction error is reduced. In the polynomial regression, the regression equation is represented by: $y=a_0+a_1x+a_2x^2+a_3x^3+\ldots+a_nx^n$ ($a_0, a_1, \ldots, a_n$ are constants).

Figure 8:
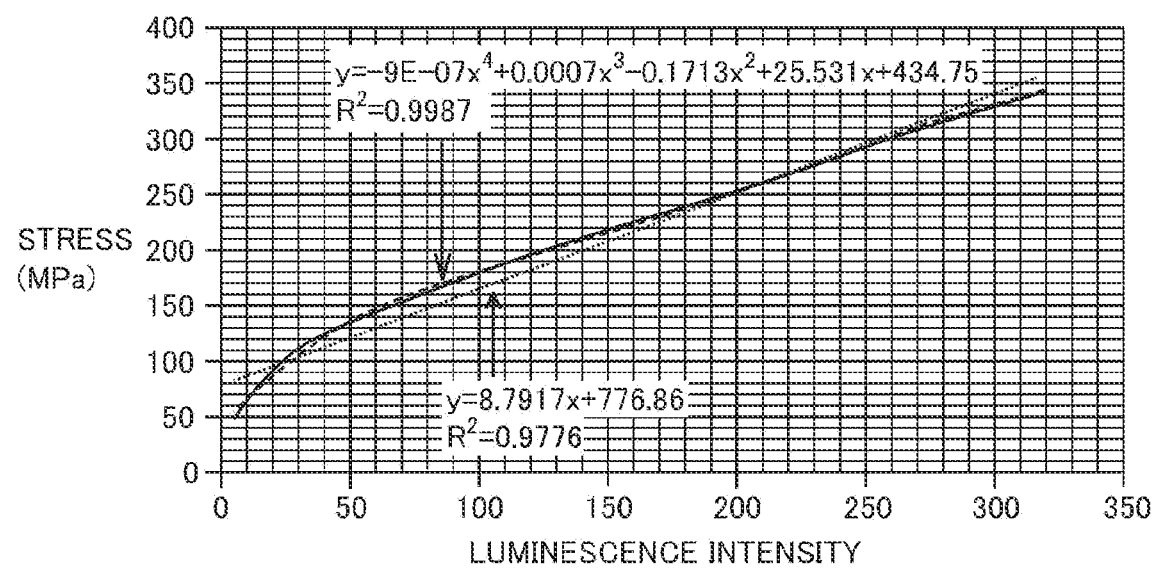
FIG. 8 is a chart showing regression equations obtained by linear regression and polynomial regression.

FIG. 8 is a chart showing regression equations obtained by linear regression and polynomial regression. In FIG. 8, the solid line is the luminescence intensity-stress curve shown in FIG. 6. The dotted line indicates a regression equation (linear expression) obtained by linear regression. The broken line indicates the regression equation obtained by polynomial regression. The regression equation is obtained by fourth degree polynomial regression.

As shown in FIG. 8, in linear regression, the regression equation is lower than the luminescence intensity-stress curve in the region where the luminescence intensity is small. Therefore, in this region, the stress predicted from the regression equation is smaller than the actual stress. Meanwhile, in the region where the luminescence intensity is large, the regression equation is higher than the luminescence intensity-stress curve. Therefore, in this region, the stress predicted from the regression equation is larger than the actual stress. In the linear regression, a prediction error arises as described above.

In contrast, in the fourth degree polynomial regression, it is revealed that the regression equation does not deviate from the luminescence intensity-stress curve, but well coincides with the luminescence intensity-stress curve irrespectively of the magnitude of the luminescence intensity. In the example of FIG. 8, the coefficient of determination $R^2$ of the regression equation (fourth degree polynomial) was 0.9987 while the coefficient of determination $R^2$ of the regression equation (linear expression) was 0.9776. As described above, in the fourth degree polynomial regression, the regression equation and the luminescence intensity-stress curve well coincide with each other as compared with the linear regression. Therefore, by applying the regression equation consisting of a fourth degree polynomial to the calibration curve, it is possible to predict the stress with high accuracy on the basis of the luminescence intensity of stress luminescence.

Figure 9:
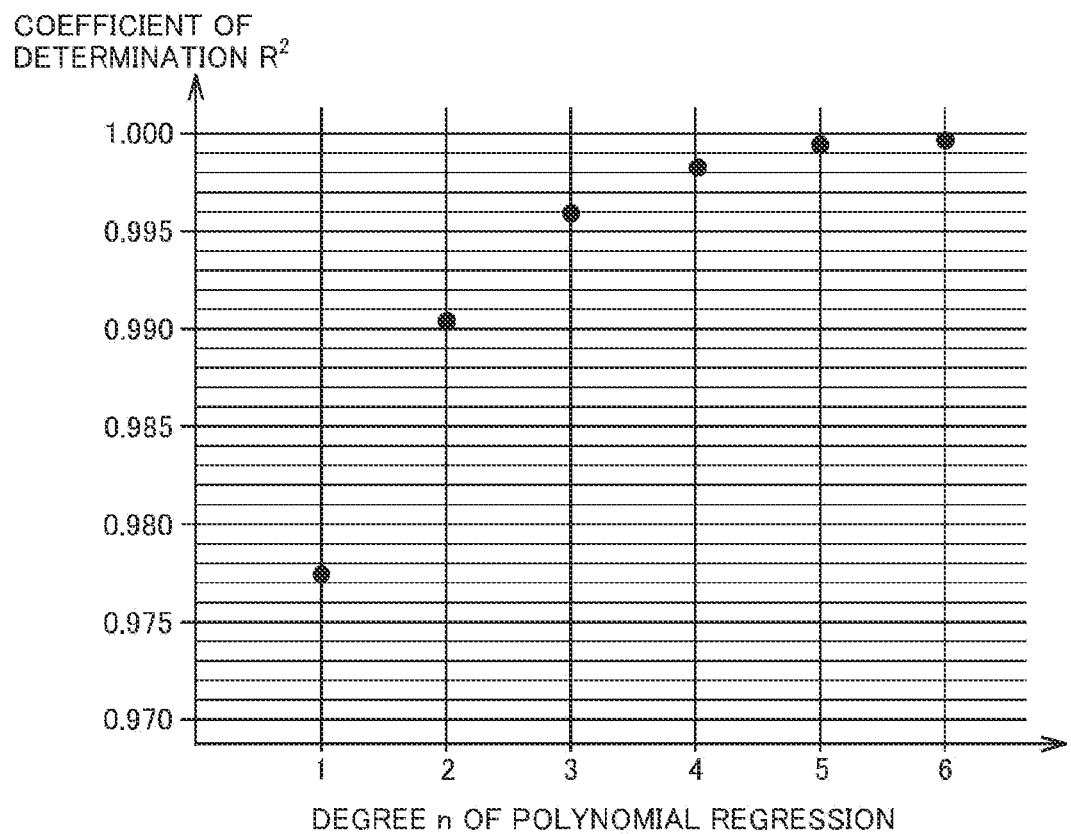
FIG. 9 is a chart showing a relationship between a degree of an n-degree polynomial, and a coefficient of determination R2 in polynomial regression.

Further, the present inventors studied for an appropriate degree in the polynomial regression, and obtained the result as shown in FIG. 9. FIG. 9 is a chart showing the relationship between the degree of an n-degree polynomial, and a coefficient of determination $R^2$ in polynomial regression. As to the relationship shown in FIG. 9, for the luminescence intensity-stress curve shown in FIG. 7, polynomial regression was conducted with n=1 (corresponding to linear regression) and with each degree of n=2 to 6, and a coefficient of determination $R^2$ was determined at each degree.

According to FIG. 9, it is revealed that the coefficient of determination $R^2$ elevates as the degree in the polynomial regression is increased from n=1. With a fourth or higher degree, the coefficient of determination $R^2$ is saturated, so that difference by increase in the degree is little observed.

In the present embodiment, the degree in the polynomial regression is fourth or higher degree on the basis of the result shown in FIG. 9. Further, in consideration of a processing load on the regression analysis, the degree in the polynomial regression is set at 4. In this manner, it is possible to create a calibration curve having high reliability without increasing the processing load.

In the step of storing a regression equation (S43), the regression equation (fourth degree polynomial) obtained in the step (S42) is stored as calibration curve data in storage device 16. The calibration curve data include information concerning stress luminescent film 1 formed on test piece 2 (information such as composition and thickness of stress luminescent film 1), as well as data of regression equation (fourth degree polynomial).

[Stress Measuring Step]

Next, the stress measuring step (S200 in FIG. 1) is described.

Figure 10:
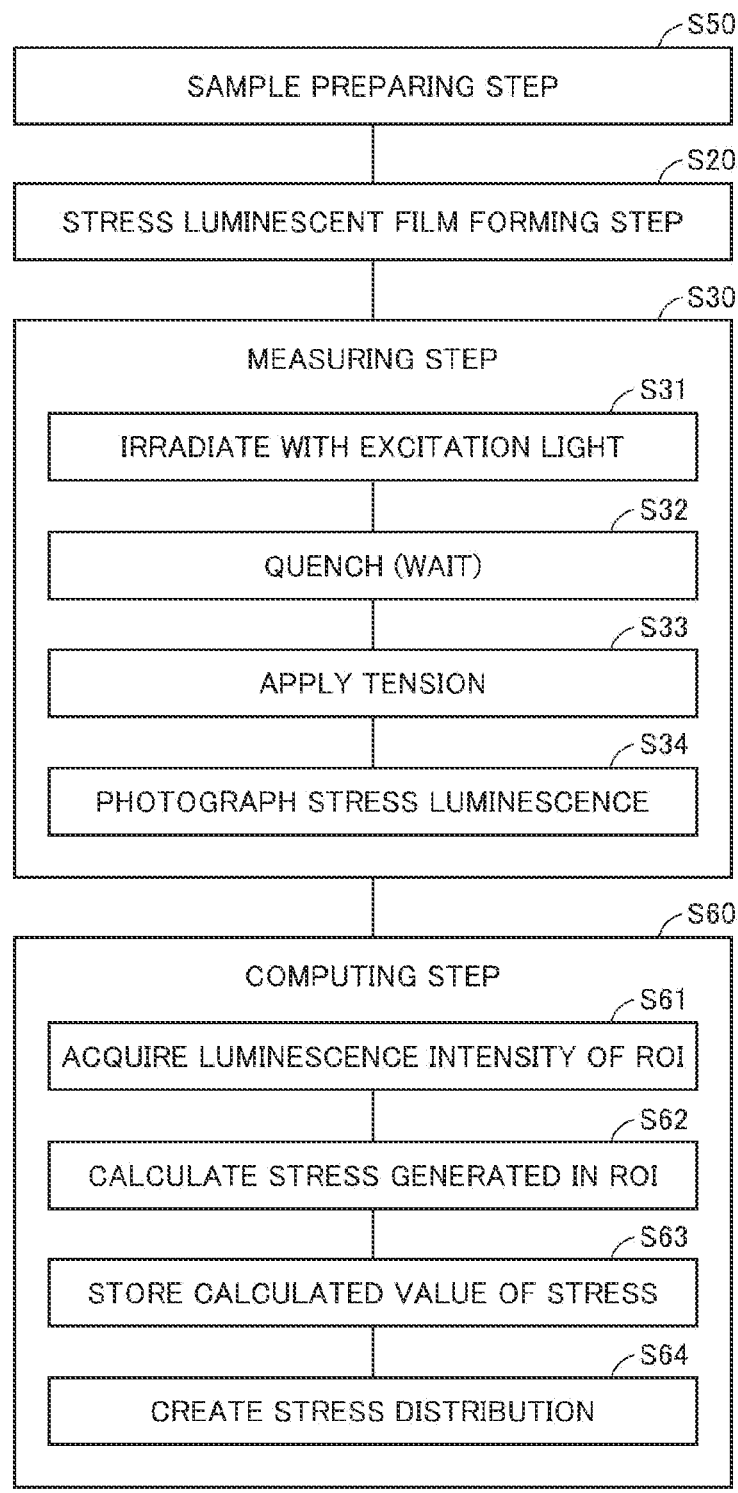
FIG. 10 is a flowchart for illustrating a stress measuring step.

FIG. 10 is a flowchart for illustrating the stress measuring step (S200 in FIG. 1). As shown in FIG. 10, stress measuring step (S200) has a sample preparing step (S50), a stress luminescent film forming step (S20), a measuring step (S30), and a computing step (S60).

First, by the sample preparing step (S50), a sample is prepared. In the stress luminescent film forming step (S20), a stress luminescent film is formed in a predetermined region on the surface of the sample. The stress luminescent film formed by this step (S20) has the same configuration as stress luminescent film 1 formed in the stress luminescent film forming step (S20) in the calibration curve creating step (S100). The stress luminescent film on the sample corresponds to one example of "first stress luminescent film", and stress luminescent film 1 on test piece 2 corresponds to one example of "second stress luminescent film".

Specifically, stress luminescent film 1 on test piece 2, and the stress luminescent film on the sample are at least the same in composition and thickness of the stress luminescent film. In the present description, being the same in composition of the stress luminescent film means that they are at least the same in composition and density of the stress luminescent material contained in the stress luminescent film. It is to be noted that the density of the stress luminescent material is determined by a mixed amount of the stress luminescent material in the stress luminescent film.

This is based on that the composition of the stress luminescent film (composition, density and the like of stress luminescent material) and the thickness of the stress luminescent film influence on the luminescence intensity of stress luminescence. The variation in the luminescence intensity-stress curve depending on the composition of the stress luminescent material (see FIG. 7) comes from the variation in color and intensity of luminescence depending on the composition of the stress luminescent material. Also, this is attributed to that the luminescence intensity for the same stress increases with the density (mixed amount) of the stress luminescent material even for the same composition of the stress luminescent material.

Also, the variation in the luminescence intensity-stress curve depending on the thickness of the stress luminescent film even for the same composition of the stress luminescent film (see FIG. 7) is attributed to that the luminescence intensity for the same stress increases with the thickness of the stress luminescent film.

It is preferred that stress luminescent film 1 on test piece 2 and the stress luminescent film on the sample are formed in the same process. For example, in the case of employing a method of pasting a stress luminescent sheet in which the stress luminescent material is mixed to the sample with an adhesive in the step (S20), it is preferred to paste a stress luminescent sheet that is prepared in the same process as that for the stress luminescent sheet pasted to test piece 2, to the sample. The two stress luminescent sheets prepared in the same process have the same composition and the same thickness. In consideration of the variation in stress luminescent ability due to variation in process, it is more preferred that the stress luminescent sheet prepared in the same process is prepared at the same time with the stress luminescent sheet pasted to test piece 2 (for example, in the same rot).

Alternatively, in the case of employing a method of applying a stress luminescent paint to the sample in the step (S20), a stress luminescent paint that is prepared in the same process as that for the stress luminescent paint applied to test piece 2, is applied to the sample. At this time, the stress luminescent paint is applied to the sample so that the stress luminescent film on the sample has the same thickness as stress luminescent film 1 on test piece 2. Likewise the stress luminescent sheet as described above, in consideration of the variation in stress luminescent ability due to variation in process, it is more preferred that the stress luminescent paint prepared in the same process is prepared at the same time with the stress luminescent paint applied to test piece 2 (for example, in the same rot).

Next, the measuring step (S30) is performed. In this step (S30), stress luminescence of the stress luminescent film when a tension is applied to the sample is measured. This step (S30) is basically executed in the same procedure as the measuring step (S30) in the calibration curve creating step (S100). That is, stress luminescence of the stress luminescent film is measured by using stress measuring apparatus 100 shown in FIG. 3.

Specifically, after the stress luminescent film is brought into an excited state, a tension is applied to the sample by driving tensile tester 4. Photographing device 8 photographs luminescence of the stress luminescent film on the sample surface. At this time, distribution of luminescence intensity appears in an image of the stress luminescent film (luminescent image) photographed by photographing device 8. The distribution of luminescence intensity represents distribution of stress generated on the surface of the sample. To be more specific, in the luminescent image, the part where the luminescence intensity is large indicates the part where the stress is large, and the part where the luminescence intensity is small indicates the part where the stress is small.

Next, the computing step (S60) is performed. In the computing step (S60), a stress generated in the sample is measured by using a luminescent image photographed by photographing device 8 in the measuring step (S30), and a calibration curve (regression equation) stored in storage device 16, and on the basis of the measured stress, distribution of stress generated on the sample surface in response to the tension is determined.

Specifically, the computing step (S60) has a step of acquiring luminescence intensity of ROI (S61), a step of calculating stress generated in ROI (S62), a step of storing a calculated value of stress (S63), and a step of creating stress distribution (S64).

In the step of acquiring luminescence intensity of ROI (S61), image data (video data) photographed by photographing device 8 is cut out in frame. Then, for a luminescent image of one frame, luminescence intensity in a preset ROI is calculated. Luminescence intensity in ROI can be calculated by statistically processing luminescence intensity in ROI. In the present embodiment, an average luminescence intensity in ROI is calculated.

In the step of calculating stress generated in ROI (S62), stress generated in ROI is calculated by using a calculated value of luminescence intensity in ROI acquired in the step (S61), and a calibration curve (regression equation) stored in storage device 16. Specifically, by substituting a calculated value of luminescence intensity in ROI for independent variable x of the regression equation (fourth degree polynomial) which is the calibration curve, a stress that is dependent variable y is calculated.

In the step of storing a calculated value of stress (S63), a calculated value of stress in ROI calculated in the step (S62) is stored in storage device 16. When a plurality of ROIs are set on the surface of the sample, the step (S61) and the step (S62) are performed for each ROI to calculate a stress generated in each ROI. Then, in the step (S63), the calculated value of stress in each ROI is associated with the positional information of ROI on the sample surface, and stored in storage device 16.

In the step of creating stress distribution (S64), data indicating distribution of stress on the sample surface is created on the basis of the calculated value of stress for each ROI stored in storage device 16. The data include positional information of each ROI on the sample surface, and calculated values of stress. That is, data indicating stress distribution on the surface of the sample in the timing in which the luminescent image of one frame is obtained is created. The created data indicating stress distribution is stored in storage device 16.

As described above, in accordance with the stress measuring method according to the present embodiment, by creating a calibration curve representing a relationship between a luminescence intensity of stress luminescence and a stress using a test piece formed with a stress luminescent film having the same configuration as the stress luminescent film formed on the surface of the sample, it is possible to measure a stress generated in the sample from a luminescence intensity of the stress luminescent film under application of external force to the sample, using the calibration curve. In this manner, it is possible to quantitatively measure distribution of stress generated on the surface of the sample by the external force.

Furthermore, in the stress measuring method according to the present embodiment, by creating a luminescence intensity-stress curve plotting a relationship between a luminescence intensity of stress luminescence and a stress under application of external force to a test piece, and performing a polynomial regression analysis for the luminescence intensity-stress curve, a regression equation consisting of a fourth or higher degree polynomial is created as the calibration curve. Since the regression equation consisting of a fourth or higher degree polynomial well coincides with the luminescence intensity-stress curve, use of the regression equation as the calibration curve makes it possible to accurately measure a stress generated in the sample on the basis of the luminescence intensity of stress luminescence under application of external force to the sample. As a result, it becomes possible to quantitatively measure stress distribution generated on the surface of the sample with high accuracy.

[Other Configuration Examples]

(1) Regarding Calibration Curve

As described above, the luminescence intensity of stress luminescence depends on the composition (composition and density of the stress luminescent material) and the thickness of the stress luminescent film. Therefore, a configuration of creating a calibration curve (regression equation) for each combination of composition and thickness of the stress luminescent film, and storing in storage device 16 may be employed. In this configuration, in the stress measuring step (S200), a corresponding calibration curve can be read out from storage device 16 and used according to the composition and the thickness of the stress luminescent film formed on the sample.

Further, the luminescence intensity of stress luminescence also depends on the strain rate as well as the magnitude of stress. For example, in the case of a tensile test, since the strain energy increases with the tensile speed even for the same tension, the luminescence intensity increases. Therefore, a configuration of creating a calibration curve for each tensile speed, and storing in storage device 16 may be employed. In this configuration, in the stress measuring step (S200), a corresponding calibration curve can be read out from storage device 16 and used according to the tensile speed of the tension applied to the sample.

(2) Regarding Stress Measuring Program

According to the present embodiment, in control device 14 of stress measuring apparatus 100 (see FIG. 5), processor 140 that executes stress measuring program 160 can be configured such that, upon input of an image of the stress luminescent film (luminescent image) under application of external force to the sample via communication I/F 146, processor 140 measures stress distribution on the surface of the sample on the basis of the luminescent image and calibration curve data 162 stored in storage device 16, and outputs the measurement result via display 142 or communication I/F 146. In this configuration, the input data may include a luminescent image photographed by a photographing device belonging to other stress measuring apparatus, as well as a luminescent image photographed by photographing device 8 belonging to stress measuring apparatus 100 (FIG. 3). Alternatively, calibration curve data 162 stored in storage device 16 may include calibration curve data that is created by using other stress measuring apparatus as well as calibration curve data created by using stress measuring apparatus 100. Both of the luminescent image and the calibration curve data can be acquired by communication with an external device, or by a user input via operation circuitry 144.

(3) Regarding Stress Luminescent Film

The stress luminescent film formed on the surface of the sample and the test piece is preferably a stress luminescent film having a thickness of less than or equal to 40 µm. This is because it becomes difficult to capture a slight change in stress generated on the surface of the measurement target as the thickness of the stress luminescent film increases. As a reason for this, when the thickness of the stress luminescent film may increases, the luminescence under application of a force to the measurement target can be derived from stress generated in the stress luminescent film. Also, as the thickness of the stress luminescent film increases, the stress luminescent film can suppress the force applied to the measurement target. As a result, as the thickness of the stress luminescent film increases, the luminescence intensity reflects the stress of the stress luminescent film in the step of creating a calibration curve, leading the fear of deteriorating the accuracy of the calibration curve.

The present inventors considered thinning the stress luminescent film, and found that by making the thickness of the stress luminescent film be less than or equal to 40 µm, it is possible to image a slight change in stress generated on the surface of the measurement target by stress luminescence. According to this finding, the thickness of the stress luminescent film is preferably less than or equal to 40 µm, and is more preferably less than or equal to 5 µm. This is attributed to that the stress luminescent amount independent of the film thickness ratio is kept even when the film thickness of the stress luminescent film is reduced. Further, since the afterglow amount that is a base line in luminescence characteristics decreases as the film thickness of the stress luminescent film decreases, the proportion of the stress luminescent amount in the entire luminescence intensity increases, resulting that the contrast of the luminescence intensity is enhanced.

According to the measurement result shown in FIG. 6, the stress luminescent amount deteriorates as the film thickness of the stress luminescent film decreases. On the other hand, since the afterglow amount that is a base line in luminescence characteristics decreases as the film thickness of the stress luminescent film decreases, the proportion of the stress luminescent amount in the entire luminescence intensity increases. Also, the change with time of the afterglow amount decreases as the film thickness reduces, resulting that the peak waveform becomes acute. As a result, the contrast of the luminescent image is enhanced, and it becomes possible to measure stress luminescence based on slight change in stress with high accuracy.

The stress luminescent amount keeps a high stress luminescent amount independent of the film thickness ratio even when the film thickness of the stress luminescent film is reduced. In the example of FIG. 6, it can be determined that the stress luminescent film having a film thickness of 5 µm is preferable for realizing high measurement sensitivity.

[Aspects]

It is to be understood by a person skilled in the art that the plurality of exemplary embodiments described above are specific examples of the following aspects.

(First item) A stress measuring method according to one aspect includes creating a calibration curve representing a relationship between a luminescence intensity of stress luminescence and a stress; forming a first stress luminescent film on a surface of a sample; applying external force to the sample; and measuring a stress generated in the sample on the basis of a luminescence intensity of the first stress luminescent film under application of the external force to the sample, using the calibration curve. The creating the calibration curve includes forming a second stress luminescent film having the same configuration as the first stress luminescent film on a surface of a test piece, applying external force to the test piece, detecting the external force to be applied to the test piece, photographing the test piece under application of the external force, creating a luminescence intensity-stress curve plotting a relationship between a luminescence intensity of stress luminescence and a stress, on the basis of a photographed luminescent image of the second stress luminescent film and a detection value of the external force obtained by the detecting the external force, creating a regression equation consisting of a fourth or higher degree polynomial representing a regression relationship of the stress with respect to the luminescence intensity by polynomial regression analysis of the luminescence intensity-stress curve, and storing the regression equation as the calibration curve.

According to the stress measuring method described in the first item, by creating a calibration curve representing a relationship between a luminescence intensity of stress luminescence and a stress using a test piece formed with a second stress luminescent film having the same configuration as the first stress luminescent film formed on the surface of the sample, it is possible to measure a stress generated in the sample from the luminescence intensity of the first stress luminescent film under application of external force to the sample, using the calibration curve. In this manner, it is possible to quantitatively measure distribution of stress generated on the surface of the sample by the external force.

Furthermore, in the stress measuring method described in the first item, by creating a luminescence intensity-stress curve plotting a relationship between a luminescence intensity of stress luminescence and a stress under application of external force to a test piece, and performing a polynomial regression analysis for the luminescence intensity-stress curve, a regression equation consisting of a fourth or higher degree polynomial is created as the calibration curve. Since the regression equation consisting of a fourth or higher degree polynomial well coincides with the luminescence intensity-stress curve, use of the regression equation as the calibration curve makes it possible to accurately measure a stress generated in the sample on the basis of the luminescence intensity of stress luminescence under application of external force to the sample. As a result, it becomes possible to quantitatively measure stress distribution generated on the surface of the sample with high accuracy.

(Second item) In the stress measuring method described in the first item, the creating the regression equation includes creating a regression equation consisting of a fourth degree polynomial by the polynomial regression analysis.

In this manner, it is possible to acquire a regression equation showing excellent coincidence with the luminescence intensity-stress curve as the calibration curve without increasing the processing load on the polynomial regression analysis.

(Third item) In the stress measuring method described in the first item or second item, the forming the second stress luminescent film includes forming the second stress luminescent film having at least the same composition and thickness as the first stress luminescent film.

Since the luminescence intensity of stress luminescence depends on the composition and the thickness of the stress luminescent film, by making the second stress luminescent film have the same composition and thickness as those of the first stress luminescent film, it is possible to create a calibration curve for measuring stress luminescence of the first stress luminescent film on the basis of the luminescence intensity-stress curve of stress luminescence of the second stress luminescent film.

(Fourth item) In the stress measuring method described in the third item, the forming the second stress luminescent film includes forming the second stress luminescent film containing a stress luminescent material having at least the same composition and the same density as the first stress luminescent film.

In this manner, it is possible to create a calibration curve for measuring stress luminescence of the first stress luminescent film on the basis of the luminescence intensity-stress curve of stress luminescence of the second stress luminescent film.

(Fifth item) In the stress measuring method described in the first item to the fourth item, the measuring the stress generated in the sample includes photographing the sample under application of the external force, measuring a stress generated in each of a plurality of regions of interest set on the surface of the sample using the calibration curve from a photographed luminescent image of the first stress luminescent film, and measuring stress distribution on the surface of the sample on the basis of a plurality of measured values of stress respectively corresponding to the plurality of regions of interest.

In this manner, it is possible to quantitatively measure distribution of stress generated on the surface of the sample on the basis of stress luminescence of the first stress luminescent film under application of external force.

(Sixth item) In the stress measuring method described in the first item to the fifth item, the forming the first stress luminescent film includes forming the first stress luminescent film having a thickness of less than or equal to 40 μm on the surface of the sample. The forming the second stress luminescent film includes forming the second stress luminescent film having the same thickness as the first stress luminescent film on the surface of the test piece.

In this manner, the second stress luminescent film is capable of capturing a slight change in stress generated on the surface of the test piece, so that a calibration curve having high accuracy can be created. Then, by measuring a stress from stress luminescence of the first stress luminescent film using the created calibration curve, it becomes possible to quantitatively measure a slight change in stress generated on the surface of the sample.

(Seventh item) A computer readable non-transitory storage medium according to one aspect stores a stress measuring program that measures a stress generated in a sample when external force is applied to the sample. On a surface of the sample, a first stress luminescent film is formed. The stress measuring program causes a computer to execute creating a calibration curve representing a relationship between a luminescence intensity of stress luminescence and a stress. The creating the calibration curve includes applying external force to a test piece having a surface formed with a second stress luminescent film having the same configuration as the first stress luminescent film, applying external force to the test piece, detecting the external force to be applied to the test piece, photographing the test piece under application of the external force, creating a luminescence intensity-stress curve plotting a relationship between a luminescence intensity of stress luminescence and a stress, on the basis of a photographed luminescent image of the second stress luminescent film and a detection value of the external force obtained by the detecting the external force, creating a regression equation consisting of a fourth or higher degree polynomial representing a regression relationship of the stress with respect to the luminescence intensity by polynomial regression analysis of the luminescence intensity-stress curve, and storing the regression equation as the calibration curve.

According to the computer readable non-transitory storage medium described in the seventh item, by creating a calibration curve representing a relationship between a luminescence intensity of stress luminescence and a stress using a test piece formed with a second stress luminescent film having the same configuration as the first stress luminescent film formed on the surface of the sample, it is possible to measure a stress generated in the sample from the luminescence intensity of the first stress luminescent film under application of external force to the sample, using the calibration curve. Further, by creating a regression equation consisting of a fourth or higher degree polynomial by performing a polynomial regression analysis for the luminescence intensity-stress curve under application of external force on the test piece, it is possible to create a calibration curve having high reliability.

(Eighth item) The computer readable non-transitory storage medium described in the seventh item causes a computer to further execute applying external force to the sample; photographing the sample under application of the external force; and measuring a stress generated in the sample on the basis of a luminescence intensity of the photographed first stress luminescent film using the calibration curve.

According to this, it is possible to accurately measure a stress generated in the sample from stress luminescence of the first stress luminescent film using the calibration curve having high reliability.

(Ninth item) In the computer readable non-transitory storage medium described in the eighth item, the measuring the stress includes measuring a stress generated in each of a plurality of regions of interest set on the surface of the sample using the calibration curve from a photographed luminescent image of the first stress luminescent film, and measuring stress distribution on the surface of the sample on the basis of a plurality of measured values of stress respectively corresponding to the plurality of regions of interest.

In this manner, it becomes possible to quantitatively measure stress distribution generated on the surface of the sample when external force is applied to the sample with high accuracy.

(Tenth item) A stress measuring apparatus according to one aspect measures a stress generated in a sample when external force is applied to the sample. On a surface of the sample, a first stress luminescent film is formed. The stress measuring apparatus includes: a tester that applies external force to a sample; a light source that irradiates a first stress luminescent film with excitation light; a photographing device that photographs a sample under application of external force; a storage device that stores a calibration curve representing a relationship between a luminescence intensity of stress luminescence and a stress; and a control device that measures a stress generated in the sample on the basis of a luminescence intensity of the first stress luminescent film photographed by the photographing device using the calibration curve. The tester applies external force to a test piece having a surface formed with a second stress luminescent film having the same configuration as the first stress luminescent film. The tester detects the external force to be applied to the test piece. The photographing device photographs the test piece under application of the external force. The control device creates a luminescence intensity-stress curve plotting a relationship between a luminescence intensity of stress luminescence and a stress on the basis of a luminescent image of the second stress luminescent film photographed by the photographing device, and a detection value of the external force. The control device creates a regression equation consisting of a fourth or higher degree polynomial representing a regression relationship of the stress with respect to the luminescence intensity by polynomial regression analysis of the luminescence intensity-stress curve. The control device stores the regression equation as the calibration curve in the storage device.

According to the stress measuring apparatus described in the tenth item, by creating a calibration curve representing a relationship between a luminescence intensity of stress luminescence and a stress using a test piece formed with a second stress luminescent film having the same configuration as the first stress luminescent film formed on the surface of the sample, it is possible to measure a stress generated in the sample from the luminescence intensity of the first stress luminescent film under application of external force to the sample, using the calibration curve. Further, by creating a regression equation consisting of a fourth or higher degree polynomial by creating a luminescence intensity-stress curve under application of external force on a test piece and performing a polynomial regression analysis for the luminescence intensity-stress curve, it is possible to create a calibration curve having high reliability. By using a calibration curve having high reliability, it is possible to accurately measure a stress generated in a sample on the basis of a luminescence intensity of stress luminescence under application of external force to the sample. As a result, it becomes possible to quantitatively measure stress distribution generated on the surface of the sample with high accuracy.

Regarding the above embodiments and modified examples, it has been predicted from the original filing to appropriately combine configurations described in embodiments including combinations that are not referred in the description unless inconvenience or contradiction occurs.

Although the embodiments of the present disclosure have been described, it is to be understood that the embodiments disclosed herein are illustrative, but are not restrictive in every respect. The scope of the present disclosure is indicated by the appended claims, and is intended to include all modifications within the equivalent meaning and scope of the claims.

What is claimed is:

1. A stress measuring method that measures a stress generated in a sample when external force is applied to the sample, the sample having a surface formed with a first stress luminescent film, the stress measuring method comprising:
   creating a calibration curve representing a relationship between a luminescence intensity of stress luminescence and a stress; and
   measuring a stress generated in the sample on the basis of a luminescence intensity of the first stress luminescent film under application of the external force to the sample,
   wherein the creating the calibration curve including
   forming a second stress luminescent film having the same configuration as the first stress luminescent film, on a surface of a test piece,
   applying external force to the test piece,
   detecting the external force to be applied to the test piece,
   photographing the test piece under application of the external force,
   creating a luminescence intensity-stress curve, which represents a relationship between a luminescence intensity of stress luminescence and a stress on the basis of a photographed luminescent image of the second stress luminescent film and a detection value of external force obtained by the detecting the external force, creating a regression equation consisting of a fourth or higher degree polynomial representing a regression relationship of the stress with respect to the luminescence intensity by polynomial regression analysis of the luminescence intensity-stress curve, and storing the regression equation as the calibration curve, and wherein the measuring the stress generated in the sample including applying external force to the sample, photographing the sample under application of the external force, and measuring the stress generated in the sample on the basis of the luminescence intensity of the first stress luminescent film, using the calibration curve.

2. The stress measuring method according to claim 1, wherein the creating the regression equation includes creating a regression equation consisting of a fourth degree polynomial by the polynomial regression analysis.

3. The stress measuring method according to claim 1, wherein the forming the second stress luminescent film includes forming the second stress luminescent film having at least the same composition and thickness as the first stress luminescent film.

4. The stress measuring method according to claim 3, wherein the forming the second stress luminescent film includes forming the second stress luminescent film containing a stress luminescent material having at least the same composition and the same density as the first stress luminescent film.

5. The stress measuring method according to claim 1, wherein the measuring the stress generated in the sample includes photographing the sample under application of the external force, measuring a stress generated in each of a plurality of regions of interest set on the surface of the sample using the calibration curve from a photographed luminescent image of the first stress luminescent film, and measuring stress distribution on the surface of the sample on the basis of a plurality of measured values of stress respectively corresponding to the plurality of regions of interest.

6. The stress measuring method according to claim 1, wherein the forming the first stress luminescent film includes forming the first stress luminescent film having a thickness of less than or equal to 40 μm on the surface of the sample, and the forming the second stress luminescent film includes forming the second stress luminescent film having the same thickness as the first stress luminescent film on the surface of the test piece.

7. A computer readable non-transitory storage medium that stores a stress measuring program that measures a stress generated in a sample when external force is applied to the sample, the sample having a surface formed with a first stress luminescent film, the stress measuring program causing the computer to execute creating a calibration curve representing a relationship between a luminescence intensity of stress luminescence and a stress, the creating the calibration curve including applying external force to a test piece having a surface formed with a second stress luminescent film having the same configuration as the first stress luminescent film, detecting the external force to be applied to the test piece, photographing the test piece under application of the external force, creating a luminescence intensity-stress curve, which represents a relationship between a luminescence intensity of stress luminescence and a stress on the basis of a photographed luminescent image of the second stress luminescent film and a detection value of external force obtained by the detecting the external force, creating a regression equation consisting of a fourth or higher degree polynomial representing a regression relationship of the stress with respect to the luminescence intensity by polynomial regression analysis of the luminescence intensity-stress curve, and storing the regression equation as the calibration curve.

8. The computer readable non-transitory storage medium according to claim 7, wherein the stress measuring program causes a computer to further execute:

applying external force to the sample;

photographing the sample under application of the external force; and measuring a stress generated in the sample on the basis of a luminescence intensity of the photographed first stress luminescent film using the calibration curve.

9. The computer readable non-transitory storage medium according to claim 8, wherein the measuring the stress includes measuring a stress generated in each of a plurality of regions of interest set on the surface of the sample using the calibration curve from a photographed luminescent image of the first stress luminescent film, and measuring stress distribution on the surface of the sample on the basis of a plurality of measured values of stress respectively corresponding to the plurality of regions of interest.

10. A stress measuring apparatus that measures a stress generated in a sample when external force is applied to the sample, the sample having a surface formed with a first stress luminescent film, the stress measuring apparatus comprising:

a tester that applies external force to the sample;

a light source that irradiates the first stress luminescent film with excitation light;

a photographing device that photographs the sample under application of external force;

a storage device that stores a calibration curve representing a relationship between a luminescence intensity of stress luminescence and a stress; and a control device that measures a stress generated in the sample on the basis of a luminescence intensity of the first stress luminescent film photographed by the photographing device, using the calibration curve, the tester applying external force to a test piece having a surface formed with a second stress luminescent film having the same configuration as the first stress luminescent film, and detecting the external force to be applied to the test piece, the photographing device photographing the test piece under application of the external force, the control device creating a luminescence intensity-stress curve, which represents a relationship between a luminescence intensity of stress luminescence and a stress on the basis of a luminescent image of the second stress luminescent film photographed by the photographing device, and a detection value of the external force, creating a regression equation consisting of a fourth or higher degree polynomial representing a regression relationship of the stress with respect to the luminescence intensity by polynomial regression analysis of the luminescence intensity-stress curve, and storing the regression equation as the calibration curve in the storage device.

* * * * *